United States Patent Office 2,946,192
Patented July 26, 1960

2,946,192
GAS TURBINE POWER PLANT

Stewart K. Hambling, Coventry, England, assignor to The Standard Motor Company Limited, Coventry, England Filed May 16, 1958, Ser. No. 735,866

6 Claims. (Cl. 60—39.51)

The invention relates to a gas turbine power plant of the kind including a power output turbine and a heat-exchanger arranged to exchange heat between exhaust gases delivered by the turbine and compressed air delivered by a compressor of the plant. It is essential in a plant of this kind for the distribution of the heat-exchanging fluids to be uniform, and use has previously been made of fins or baffles in the entry and outlet ducts of the heat-exchanger for the purpose, but these fins and baffles increase the pressure loss in the heat-exchanger.

An object of the invention is a power plant which is arranged for improved distribution of the heat-exchange fluids and which is of compact construction.

According to the invention the heat-exchanger is annular and is so arranged for the passage therethrough, in separate streams, of compressed air and turbine exhaust gases in counterflow relation, the heat-exchanger having an inlet, connected to the compressor by an annular duct, and another inlet, connected to the turbine exhaust by another annular duct, the two annular ducts being positioned one within the other and outer annular wall means of the outer annular duct also forming an enveloping wall for the plant.

Preferably the compressed air inlet to the heat-exchanger is at a radially outer position and the exhaust gas inlet to the heat-exchanger is at a radially inner position, the outer wall means of the annulus duct connecting the compressed air inlet to the compressor also forming the enveloping wall for the plant. The heat-exchanger may be arranged to discharge heated compressed air into a toroidal chest positioned radially between the two said annular ducts and leading to a toroidal chamber positioned within the toroidal chest, the toroidal chamber discharging gases to a turbine of the plant. A combustion chamber may be arranged to receive heated compressed air from the toroidal chest and to discharge combustion gases tangentially into the toroidal chamber.

The heat-exchanger may be cylindrical with heat-exchange passages extending in substantially radial planes between the inner and outer peripheries of the heat-exchanger. Preferably the heat-exchanger is constructed in accordance with British specification No. 15,886/57.

By way of example, one construction of power plant according to the invention will now be described with reference to the accompanying drawings in which.

Figure 1:
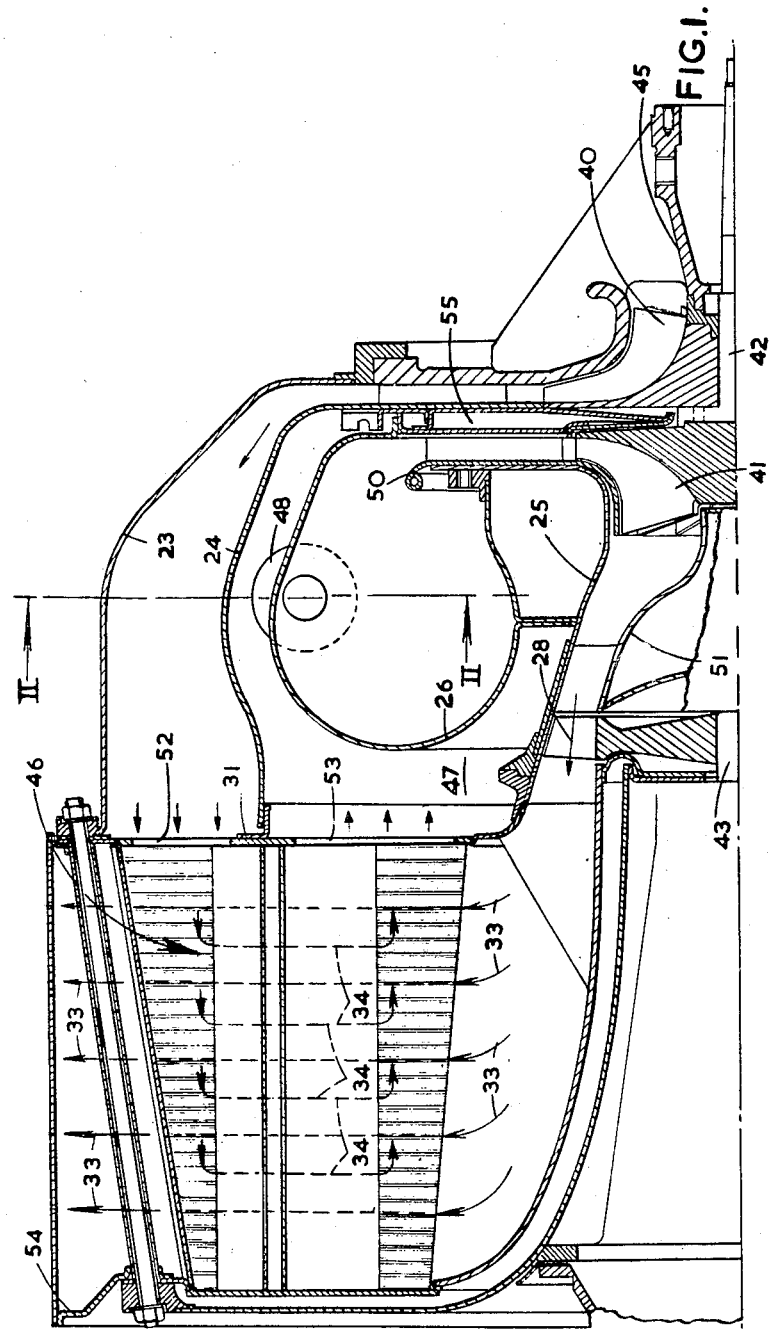
Figure 1 is a sectional semi-axial view of the plant.
Figure 2:
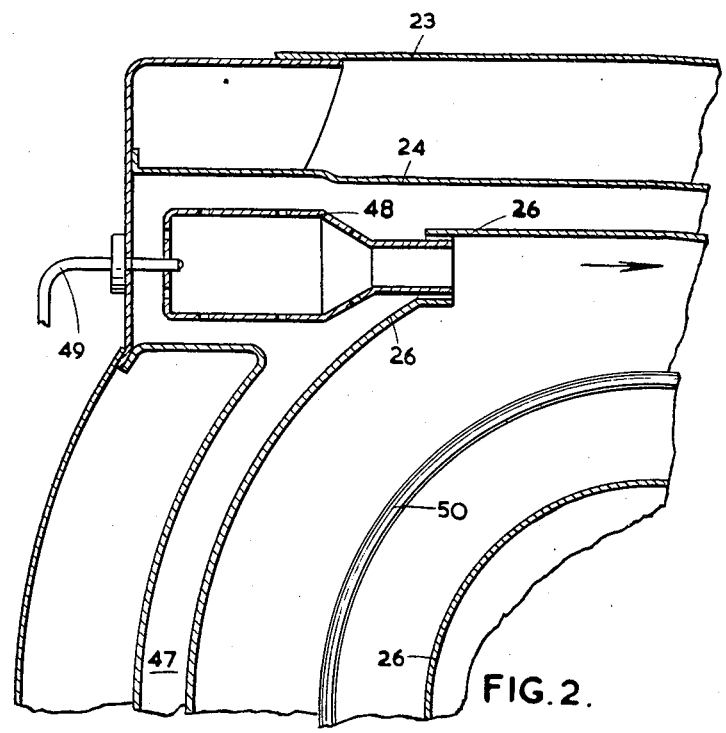
Figure 2 is a part section of the line 11—11 in Figure 1.

The power plant comprises a centrifugal compressor 40 and a centripetal turbine 41 mounted back-to-back on a shaft 42. An independent axial flow power turbine 28 is mounted on a shaft 43 separate from the shaft 42. Air is drawn in by the compressor 40 through an annular air inlet 45 and is delivered to a heat-exchanger 46 through diffuser vanes and a diffusing annular duct, which gradually changes the direction of flow from a substantially radial direction to a generally axial direction. The annular duct is defined by an annular wall 23, forming the outer casing of the plant and an inner annular wall 24. Heated air from the heat-exchanger enters a toroidal chest 47 defined by the wall 24, a toroidal wall 26 and an annular wall 25, the latter also forming a casing for the turbines 41 and 28. From the toroidal chest, the heated compressed air is led into a combustion chamber 48 arranged to discharge gases tangentially into the inside of a chamber formed by the toroidal wall 26. The combustion chamber 48 is supplied with fuel through a pipe 49. The combustion chamber has been shown diagrammatically and includes any suitable flame-tube or baffle arrangement (not shown). From the space within the toroidal wall 26, the hot gases enter the compressor-driving turbine 41 in a substantially radial direction through inlet 50 and nozzle guide vanes and are discharged substantially axially into an axially extending annular passage defined by the annular wall 25 and a further annular wall 51, positioned within the wall 25 and extending between the turbines 41 and 28. The gases then pass through the turbine 28 via nozzle guide vanes and are discharged to atmosphere via the heat-exchanger 46, where they heat the air delivered by the compressor 40.

The heat-exchanger is annular and is constructed from corrugated plates as described and claimed in British specification No. 15,886/57. The same reference numerals have been used for similar parts also appearing in that specification. The air to be heated enters an inlet header of the heat-exchanger through an opening 52 in an end plate 31 and flows through the heat-exchanger in the direction of arrows 34, leaving an outlet header of the heat-exchanger through an opening 53 in the end plate 31. The hot exhaust gases from the turbine 28 pass through an annular duct 29 which merges into an annular opening 30 at the radially inner periphery of the heat-exchanger and extending substantially throughout the axial length thereof. The direction of flow of the hot exhaust gas through the heat-exchanger is indicated by arrows 33. The hot exhaust gases pass in counterflow to the air and are discharged to atmospsere at 54. Reference 55 shows a seal to prevent leakage from the toroidal chest 47 at a position between the compressor 40 and the turbine 41.

The construction described above is compact as substantially the whole plant is positioned within the maximum diameter of the outer enveloping wall 23. Also the configuration of the annular and toroidal walls defining the various ducts and chambers provides improved distribution of the air and gases to and from the heat-exchanger, the compressor and the turbines.

What I claim as my invention and desire to secure by Letters Patent of the United States is:

1. A gas turbine power plant comprising turbine means, a compressor, an annular heat-exchanger, coaxial with said turbine and compressor and arranged to exchange heat between exhaust gases delivered by said turbine means and compressed air delivered by the compressor, a first inlet to said heat-exchanger, a first annular duct connecting the compressor delivery to said first inlet, a second inlet to said heat-exchanger, a second annular duct connecting said second inlet to the turbine exhaust, the compressed air and turbine exhaust gases passing through the heat-exchanger in counterflow relation and the two annular ducts being positioned one within the other and the outer annular duct having outer annular wall means also forming an enveloping wall for the plant, an outlet from said heat-exchanger for heated compressed air, a toroidal chest positioned radially between the two said annular ducts, said toroidal chest communicating with said outlet, a toroidal chamber positioned within said toroidal chest, a combustion chamber arranged to deliver combustion gases tangentially to said toroidal chamber and to receive heated compressed air from said toroidal chest and said toroidal chamber communicating with said turbine means.

2. A gas turbine power plant as claimed in claim 1 in which the compressed air inlet to the heat-exchanger is at a radially outer position and the exhaust gas inlet to the heat-exchanger is at a radially inner position, the outer wall means of the annular duct connecting the compressed air inlet to the compressor also forming the enveloping wall for the plant.

3. A gas turbine power plant as claimed in claim 1 in which the heat-exchanger includes heat-exchange passages extending substantially radially in substantially radial planes between the inner and outer peripheries of the heat-exchanger.

4. A gas turbine power plant as claimed in claim 3 and comprising a compressor, a compressor-driving turbine, shaft means connecting said compressor and said compressor-driving turbine, a separate power turbine providing shaft power, the compressor-driving turbine discharging gases to said separate power turbine and said separate power turbine delivering exhaust gases to the heat-exchanger.

5. A gas turbine power plant as claimed in claim 4 in which the compressor and the compressor-driving turbine are each of the radial flow type and are arranged back-to-back on a common shaft, the common shaft, the power output shaft and the heat-exchanger axis being coaxial.

6. A gas turbine power plant as claimed in claim 5 comprising first annular wall means forming an enveloping wall of the plant, second annular wall means positioned radially within the first annular wall means, the first and second annular wall means together constituting the annular duct, connecting the compressor to the heat-exchanger air inlet, the said annular duct being of diffusing shape and changing the direction of flow from a substantially radial direction to a substantially axial direction, third and fourth annular wall means positioned radially within the second annular wall means and constituting the annular duct connecting the compressor-driving turbine to the power turbine and also the power turbine to the gas inlet to the heat-exchanger, a toroidal wall positioned between the second and third annular wall means, the toroidal wall defining, together with the second and third annular wall means, the said toroidal chest and also defining the said toroidal chamber which is arranged to discharge substantially radially into the compressor-driving turbine.

References Cited in the file of this patent

UNITED STATES PATENTS 2,855,754     Giannotti _____ Oct. 14, 1958

FOREIGN PATENTS 1,003,131     France _____ Nov. 14, 1951
459,368       Italy _____ Sept. 5, 1950